US011128244B2

United States Patent
Yanagita et al.

(10) Patent No.: US 11,128,244 B2
(45) Date of Patent: Sep. 21, 2021

(54) DEVICE FOR DETECTING ROTATION DIRECTION AND METHOD FOR DETECTING ROTATION DIRECTION OF MOTOR, AND MOTOR CONTROL DEVICE

(71) Applicant: MITSUBA Corporation, Gunma (JP)

(72) Inventors: Yuichi Yanagita, Gunma (JP); Takuya Uchida, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/645,494

(22) PCT Filed: Oct. 18, 2018

(86) PCT No.: PCT/JP2018/038816
§ 371 (c)(1),
(2) Date: Mar. 9, 2020

(87) PCT Pub. No.: WO2019/082785
PCT Pub. Date: May 2, 2019

(65) Prior Publication Data
US 2020/0204094 A1    Jun. 25, 2020

(30) Foreign Application Priority Data

Oct. 25, 2017   (JP) .............................. JP2017-205846

(51) Int. Cl.
*G05F 1/10*      (2006.01)
*H02P 7/00*      (2016.01)

(52) U.S. Cl.
CPC .................................. *H02P 7/0094* (2013.01)

(58) Field of Classification Search
CPC .......... H02P 6/28; H02P 21/22; H02P 7/0094; G05B 2219/45242; G05B 19/237
See application file for complete search history.

(56) References Cited

U.S. PATENT DOCUMENTS

2005/0276581 A1   12/2005  Furuki
2015/0002187 A1*   1/2015  Schmidt ................ B60L 3/0076
                                                                 324/764.01
(Continued)

FOREIGN PATENT DOCUMENTS

DE    102007029709      1/2009
JP    S60106353         6/1985
(Continued)

OTHER PUBLICATIONS

"International Search Report (Form PCT/ISA/210) of PCT/JP2018/038816", dated Jan. 22, 2019, with English translation thereof, pp. 1-2.

(Continued)

*Primary Examiner* — Karen Masih
(74) *Attorney, Agent, or Firm* — JCIPRNET (57) ABSTRACT

A rotation direction detecting device has a current detector detecting the direction of current flowing through a motor, a voltage detector detecting voltages before and after the motor in a power supply line, and a rotation direction detector detecting the rotation direction of the motor based on the direction of the current and the voltages before and after the motor. The current detector is connected to points A, B before and after a shunt resistor, and detects the direction of the current flowing in the power supply line to form current direction information. The voltage detector is connected to points A, C before and after the motor, and detects the voltage at each position to form motor terminal voltage information. The rotation direction detector detects the rotation direction of the motor using a logical combination of the current direction information and the motor terminal voltage information.

8 Claims, 8 Drawing Sheets

(56) References Cited

U.S. PATENT DOCUMENTS

2017/0324364 A1* 11/2017 Lu ........................... H02P 27/08
2017/0346422 A1* 11/2017 Yun .......................... H02P 7/04

FOREIGN PATENT DOCUMENTS

| | | |
|---|---|---|
| JP | 2002369318 | 12/2002 |
| JP | 2010154688 | 7/2010 |
| JP | 2014045648 | 3/2014 |
| JP | 2016077130 | 5/2016 |

OTHER PUBLICATIONS

"Search Report of Europe Counterpart Application", dated Jun. 1, 2021, pp. 1-7.

* cited by examiner

| Motor drive output MOTOR DRIVER OUTPUT | | Current direction | Motor terminal voltage | | Rotation direction | ROTATION MODE |
|---|---|---|---|---|---|---|
| X | Y | | A | C | | |
| Motor energized rotation state | | | | | | |
| + | − | A → B | Hi | Lo | Forward rotation ↻ | (1) |
| − | + | B → A | Lo | Hi | Reverse rotation ↺ | (2) |
| Motor non-energized (coasting, reverse rotation) state | | | | | | |
| × | × | B → A | (Hi) | (Lo) | Forward rotation ↻ | (3) |
| × | × | A → B | (Lo) | (Hi) | Reverse rotation ↺ | (4) |

(Weak) → Recognized as Lo

DEVICE FOR DETECTING ROTATION DIRECTION AND METHOD FOR DETECTING ROTATION DIRECTION OF MOTOR, AND MOTOR CONTROL DEVICE

CROSS-REFERENCE TO RELATED APPLICATION

This application is a 371 application of the International PCT application serial no. PCT/JP2018/038816, filed on Oct. 18, 2018, which claims the priority benefits of Japan Patent Application No. 2017-205846, filed on Oct. 25, 2017. The entirety of each of the above-mentioned patent applications is hereby incorporated by reference herein and made a part of this specification.

BACKGROUND

Technical Field

The invention relates to a technique for detecting a motor operation, and more particularly relates to a device and a method for detecting a rotation direction of a motor without using a rotation sensing element.

Description of Related Art

It has been widely adopted to use a sensing element such as a Hall IC to detect the rotation direction and rotation speed of an electric motor when controlling the driving of the electric motor (Patent Document 1). On the other hand, from the viewpoints of cost reduction and motor weight reduction, so-called sensing element-less motors that detect the rotation direction of the motor without using a sensing element have also been increasing in recent years. For example, Patent Document 2 discloses a DC motor that detects the rotation speed of the motor using a current ripple which is generated when the contact between the brush and the commutator piece is switched.

RELATED ART

Patent Document

[Patent Document 1] Japanese Laid-Open No. 2010-154688
[Patent Document 2] Japanese Laid-Open No. 2016-77130

SUMMARY

Problems to be Solved

However, if rotation detection is performed using a current ripple, it may be difficult to detect the rotation direction of the motor as the state changes when the motor is energized or not energized. For example, if the motor enters a coasting state after the drive current is released (OFF), the drive current value decreases, so it is difficult to detect rotation based on a current ripple. The same applies to the case where the motor rotates reversely after the motor stops or the case where the armature is rotated by an external force during non-energization. In these cases, it may not be possible to know the rotation direction of the motor.

Means for Solving the Problems

A rotation direction detecting device for a motor according to the invention is connected to a power supply line that supplies electric power to the motor and detects a rotation direction of the motor. The rotation direction detecting device includes: a current detector detecting a direction of a current flowing through the motor; a voltage detector detecting voltages before and after the motor in the power supply line; and a rotation direction detector detecting the rotation direction of the motor based on the direction of the current detected by the current detector and the voltages detected by the voltage detector.

In the invention, the direction of the current flowing through the motor is detected by the current detector, and the voltages before and after the motor are detected by the voltage detector. Then, based on the direction of the current and the voltages before and after the motor, the rotation direction of the motor is detected by the rotation direction detector. Thus, the rotation direction of the motor can be detected without using a rotation sensing element. Therefore, the rotation direction can be detected without using a rotation sensing element even if the motor enters the coasting state after energization, the motor rotates reversely after the motor stops, or the armature rotates due to an external force when the motor is not energized, for example.

In the rotation direction detecting device, the voltage detector may include a voltage monitor that compares the voltages before and after the motor with a predetermined threshold value and converts the voltages into Hi/Lo signals respectively to be output.

Further, the power supply line may be connected to a terminal on one side and a terminal on the other side of the motor. The current detector may determine the direction of the current between a case where the current flows from the terminal on one side to the terminal on the other side and a case where the current flows from the terminal on the other side to the terminal on one side. The voltage detector may respectively detect voltages of the terminal side on one side and the terminal side on the other side of the motor in the power supply line. The rotation direction detector may detect the rotation direction of the motor by a combination of the directions of the current of the two cases and the Hi/Lo signals converted and formed with respect to the voltages on the one side and the other side of the motor.

In addition, in the rotation direction detecting device, if electric power is supplied to the motor, the rotation direction detector may determine that the motor is rotating in one direction when the direction of the current is from the one side to the other side, and the voltage on the one side in the power supply line is Hi and the voltage on the other side is Lo, and determine that the motor is rotating in the other direction when the direction of the current is from the other side to the one side, and the voltage on the one side in the power supply line is Lo and the voltage on the other side is Hi.

Further, in the rotation direction detecting device, if electric power is not supplied to the motor, the rotation direction detector may determine that the motor is rotating in one direction when the direction of the current is from the other side to the one side, and the voltage on the one side and the voltage on the other side in the power supply line are both recognized as Lo, and determine that the motor is rotating in the other direction when the direction of the current is from the one side to the other side, and the voltage on the one side and the voltage on the other side in the power supply line are both recognized as Lo.

Meanwhile, a rotation direction detecting method for a motor according to the invention is for detecting a rotation direction of the motor. The motor is connected to a power supply line for supplying electric power to the motor. The rotation direction detecting method includes: detecting a direction of a current flowing through the motor; detecting voltages before and after the motor in the power supply line; and detecting the rotation direction of the motor based on the direction of the current and the voltages.

In the invention, the direction of the current flowing through the motor is detected, the voltages before and after the motor are detected, and the rotation direction of the motor is detected based on the direction of the current and the voltages before and after the motor. Thus, the rotation direction of the motor can be detected without using a rotation sensing element. Therefore, the rotation direction can be detected without using a rotation sensing element even if the motor enters the coasting state after energization, the motor rotates reversely after the motor stops, or the armature rotates due to an external force when the motor is not energized, for example.

In the rotation direction detecting method, the voltages before and after the motor may be compared with a predetermined threshold value and the voltages may be converted into Hi/Lo signals respectively; and the rotation direction of the motor may be detected based on the direction of the current and the Hi/Lo signals corresponding to the voltages.

In addition, the power supply line may be connected to a terminal on one side and a terminal on the other side of the motor. The direction of the current may be determined between a case where the current flows from the terminal on one side to the terminal on the other side and a case where the current flows from the terminal on the other side to the terminal on one side. Voltages of the terminal side on one side and the terminal side on the other side of the motor may be respectively detected as the voltages before and after the motor in the power supply line. The rotation direction of the motor may be detected by a combination of the directions of the current of the two cases and the Hi/Lo signals converted and formed with respect to the voltages on the one side and the other side of the motor.

Furthermore, a motor control device according to the invention includes a rotation direction detecting device connected to a power supply line that supplies electric power to a motor and detecting a rotation direction of the motor. The rotation direction detecting device includes: a current detector detecting a direction of a current flowing through the motor; a voltage detector detecting voltages before and after the motor in the power supply line; and a rotation direction detector detecting the rotation direction of the motor based on the direction of the current detected by the current detector and the voltages detected by the voltage detector.

In the invention, the rotation direction detecting device, which includes the current detector detecting the direction of the current flowing through the motor; the voltage detector detecting the voltages before and after the motor; and the rotation direction detector detecting the rotation direction of the motor based on the direction of the current and the voltages before and after the motor, is provided in the motor control device to detect the rotation direction of the motor based on the direction of the current and the voltages before and after the motor. Thus, the rotation direction of the motor can be detected without using a rotation sensing element. Therefore, the rotation direction can be detected without using a rotation sensing element even if the motor enters the coasting state after energization, the motor rotates reversely after the motor stops, or the armature rotates due to an external force when the motor is not energized, for example. Hence, the motor operation state can be accurately grasped, and the accuracy of the rotation position information can be increased to improve the motor control accuracy.

Effects

According to the motor rotation direction detecting device of the invention, the current detector detecting the direction of the current flowing through the motor, the voltage detector detecting the voltages before and after the motor, and the rotation direction detector detecting the rotation direction of the motor based on the direction of the current and the voltages before and after the motor are provided. Thus, the rotation direction of the motor can be detected without using a rotation sensing element. Therefore, the rotation direction can be detected without using a rotation sensing element even if the motor enters the coasting state after energization, the motor rotates reversely after the motor stops, or the armature rotates due to an external force when the motor is not energized, for example.

According to the motor rotation direction detecting method of the invention, the direction of the current flowing through the motor is detected, the voltages before and after the motor are detected, and the rotation direction of the motor is detected based on the direction of the current and the voltages before and after the motor. Thus, the rotation direction of the motor can be detected without using a rotation sensing element. Therefore, the rotation direction can be detected without using a rotation sensing element even if the motor enters the coasting state after energization, the motor rotates reversely after the motor stops, or the armature rotates due to an external force when the motor is not energized, for example.

According to the motor control device of the invention, the rotation direction detecting device, which includes the current detector detecting the direction of the current flowing through the motor; the voltage detector detecting the voltages before and after the motor; and the rotation direction detector detecting the rotation direction of the motor based on the direction of the current and the voltages before and after the motor, is provided in the motor control device. Thus, the rotation direction of the motor can be detected without using a rotation sensing element. Therefore, the rotation direction can be detected without using a rotation sensing element even if the motor enters the coasting state after energization, the motor rotates reversely after the motor stops, or the armature rotates due to an external force when the motor is not energized, for example. The motor operation state can be accurately grasped to improve the motor control accuracy.

DESCRIPTION OF THE EMBODIMENTS

Hereinafter, embodiments of the invention will be described in detail with reference to the drawings. The following embodiments are to provide a rotation direction detecting device and a rotation direction detecting method that can accurately detect the rotation direction of a motor without using a rotation sensing element.

First Embodiment

Figure 1:
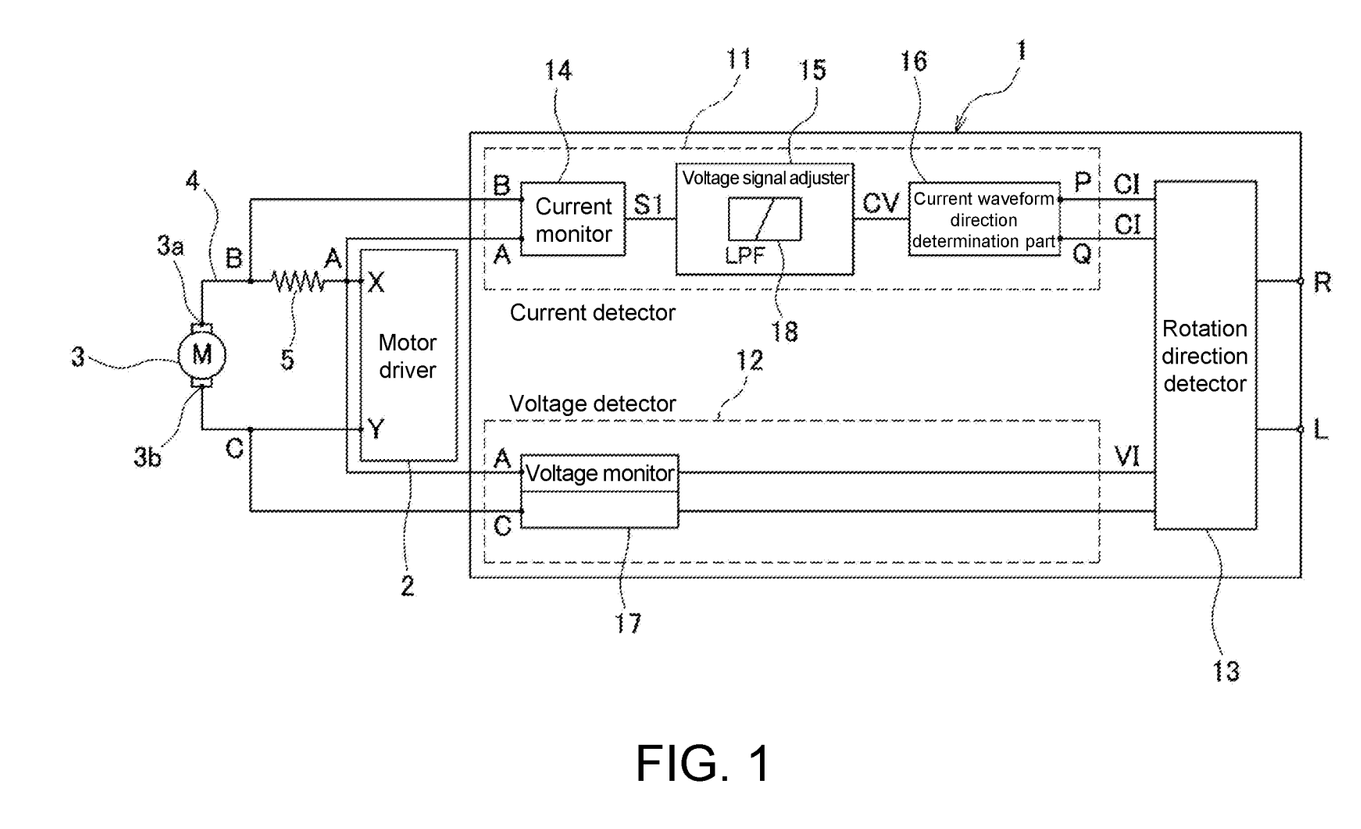
FIG. 1 is a block diagram showing a configuration of a rotation direction detecting device which is the first embodiment of the invention.
Figure 10:
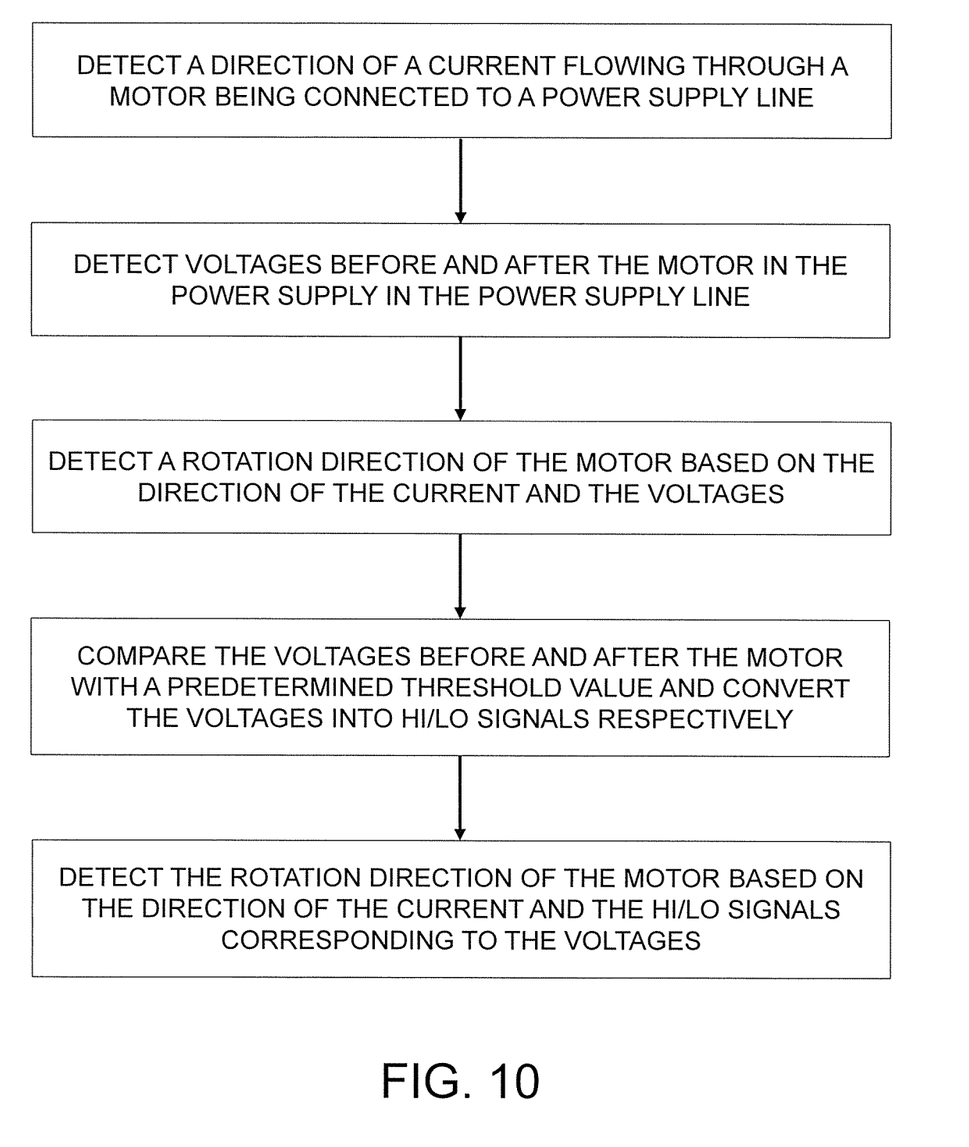
FIG. 10 is a flowchart showing a rotation direction detecting method.

FIG. 1 is a block diagram showing a configuration of a rotation direction detecting device 1 which is the first embodiment of the invention. A rotation direction detecting method according to the invention is also performed by the device and is shown in FIG. 10. The rotation direction detecting device 1 is, for example, used in a motor operation control device for a power window of a vehicle, and detects whether the motor is rotating and the rotation direction by a logical combination of the direction of a motor current (armature current) and a motor terminal voltage without using a rotation sensing element.

The rotation direction detecting device 1 is connected to a power supply line 4 that supplies electric power from a motor driver 2 to a brush DC motor 3 (hereinafter, abbreviated as motor 3). The power supply line 4 is connected to a terminal 3a (terminal on one side) and a terminal 3b (terminal on the other side) of the motor 3. The power supply line 4 is provided with a shunt resistor 5. The rotation direction detecting device 1 is connected to points A and B before and after the shunt resistor 5 (the side of the motor driver 2 and the side of the motor 3) and points A and C before and after the motor 3. In the rotation direction detecting device 1, the current (motor current) flowing through the power supply line 4 is detected from before and after the shunt resistor 5, and the terminal voltage of the motor 3 is detected from before and after the motor 3. The output of the rotation direction detecting device 1 is sent to a drive control device of the motor 3. The drive control device controls the operation of the motor 3 based on the detection result of the rotation direction detecting device 1.

As shown in FIG. 1, the rotation direction detecting device 1 includes a current detector 11 connected before and after the shunt resistor 5, a voltage detector 12 connected before and after the motor 3, and a rotation direction detector 13 detecting the rotation direction of the motor 3 based on information obtained by the current detector 11 and the voltage detector 12. The current detector 11 is provided with a current monitor 14, a voltage signal adjuster 15, and a current waveform direction determination part 16. The current detector 11 detects the direction (A→B, B→A) of the current flowing through the shunt resistor 5 and sends the current direction to the rotation direction detector 13 as current direction information CI. The voltage detector 12 is provided with a voltage monitor 17. The voltage detector 12 detects the voltages at the points A and C before and after the motor 3 due to the induced voltage, and sends the detected voltages to the rotation direction detector 13 as motor terminal voltage information VI.

Figure 2:
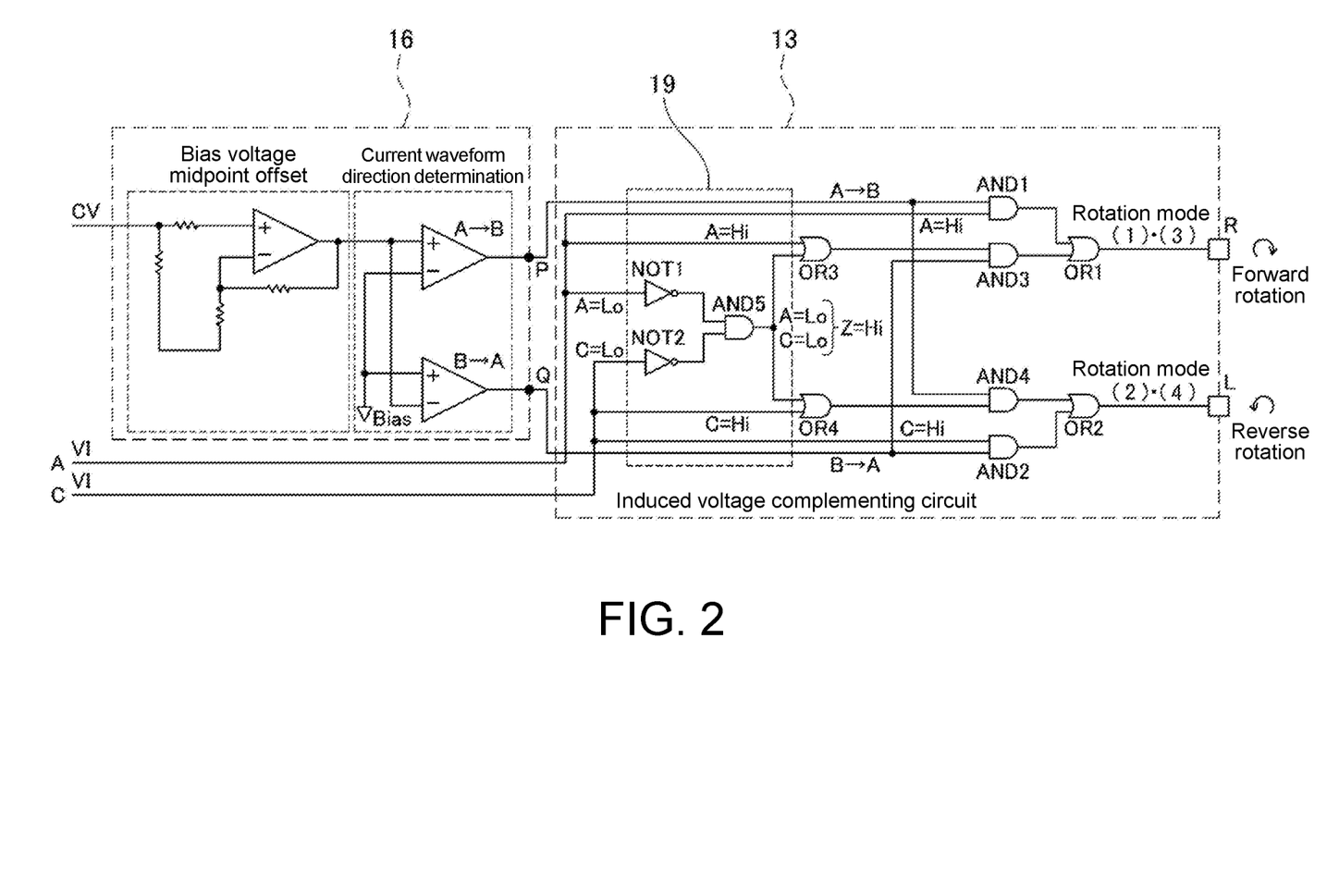
FIG. 2 is an explanatory diagram showing an internal configuration of the rotation direction detecting device.

The rotation direction detector 13 determines the rotation direction of the motor 3 based on the current direction information CI obtained from the current waveform direction determination part 16 and the motor terminal voltage information VI obtained from the voltage monitor 17. FIG. 2 is an explanatory diagram showing an internal configuration of the current waveform direction determination part 16 and the rotation direction detector 13. As shown in FIG. 2, in the rotation direction detecting device 1, a logic circuit is formed in the rotation direction detector 13, and the rotation direction of the motor 3 is detected from a combination of the current direction information CI indicating the current direction and the motor terminal voltage information VI indicating the voltages at two ends of the motor. In the rotation direction detector 13, a detection signal is output from a port R when the motor 3 rotates forward and from a port L when the motor 3 rotates reversely. Here, clockwise rotation is referred to as forward rotation (rotation in one direction) and counterclockwise rotation is referred to as reverse rotation (rotation in the other direction), but the forward and reverse rotations are relative, and any of the clockwise and counterclockwise rotation directions may be the forward (or reverse) direction.

Figure 3:
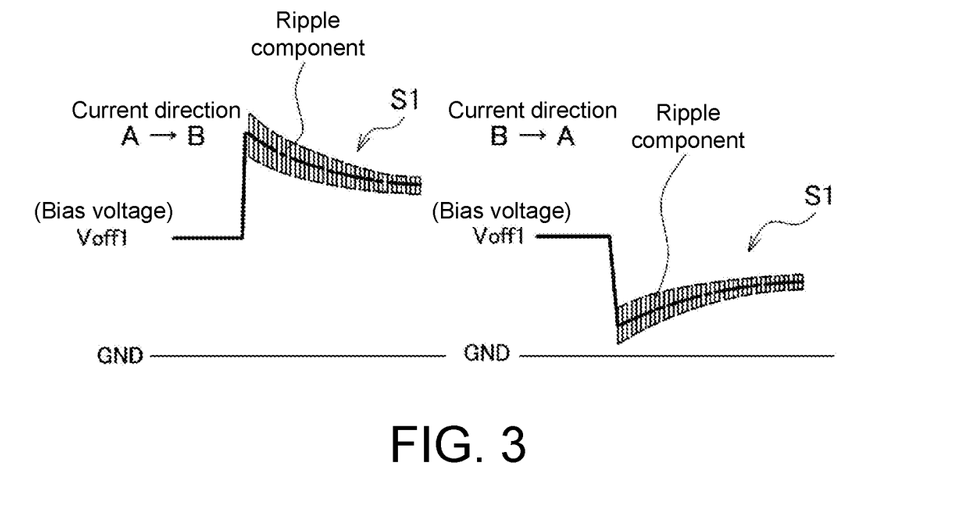
FIG. 3 is an example of an output signal from a current monitor.

The current monitor 14 of the current detector 11 detects the voltage difference (voltage drop) before and after the shunt resistor 5 to detect the voltage of the current flowing through the power supply line 4, and outputs the change of the voltage as a voltage change signal (electric signal) S1. FIG. 3 is an example of the output signal from the current monitor 14. In the current monitor 14, the voltage difference before and after the shunt resistor 5 is output in a differentially amplified form with reference to a bias voltage Voff1 based on the power supply voltage. As shown in FIG. 3, the voltage change signal S1 is output as a vertically symmetric waveform with respect to Voff1 depending on the current direction.

Figure 4:
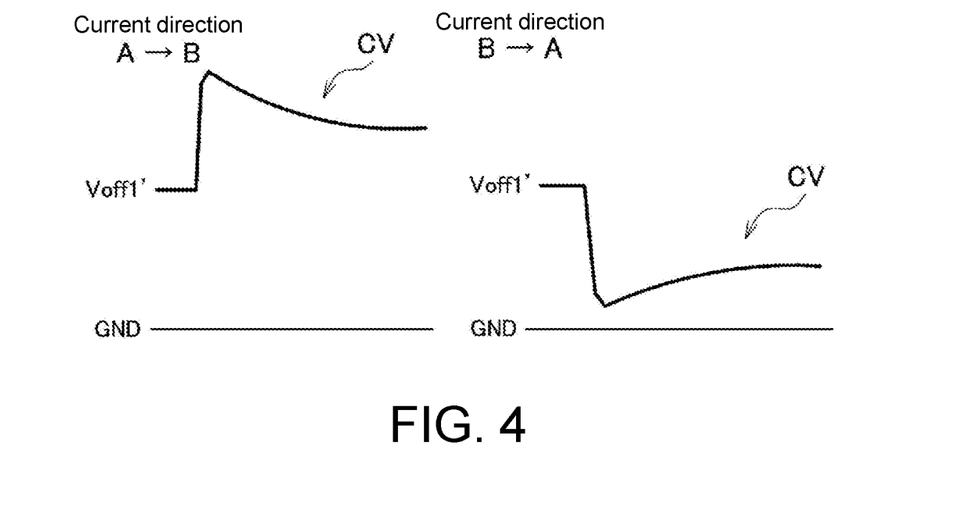
FIG. 4 is an explanatory diagram showing processing in a voltage signal adjuster.

The voltage change signal S1 output from the current monitor 14 contains a noise component and a current ripple component as can be seen from FIG. 3. Therefore, in the rotation direction detecting device 1, the central value of the current ripple component is extracted from the voltage change signal S1 by the voltage signal adjuster 15 as a change component of the motor current. FIG. 4 is an explanatory diagram showing processing in the voltage signal adjuster 15. The voltage signal adjuster 15 uses a low-pass filter 18 to extract from the voltage change signal S1 (FIG. 3) the change component of the motor current (FIG. 4), and outputs it as a current waveform signal CV.

The current waveform direction determination part 16 determines the direction of the motor current based on the current waveform signal CV input from the voltage signal adjuster 15. As described above, the voltage change signal S1 has a vertically symmetric waveform depending on the current direction, and similar to the voltage change signal S1, the current waveform signal CV also has a vertically symmetric waveform depending on the current direction. Thus, in the current waveform direction determination part 16, the current waveform signal CV is compared with a midpoint voltage Voff1', and the current direction is determined as A→B when the waveform changes above the midpoint voltage Voff1', and the current direction is determined as B→A when the waveform changes below the midpoint voltage Voff1'. The current waveform direction determination part 16 sends the current direction information CI from the port P to the rotation direction detector 13 when the current direction is A→B, and sends the current direction information CI from the port Q to the rotation direction detector 13 when the current direction is B→A.

Further, in the voltage detector 12, the voltages at the points A and C before and after the motor 3 are detected by the voltage monitor 17. In the voltage monitor 17, the voltage across the points A and C is compared with a predetermined threshold value Vs (for example, 1V). Then, if the voltage across the points A and C is larger than the threshold value Vs, a Hi signal is formed, and if the voltage is smaller than the threshold value Vs, a Lo signal is formed and amplified, and the signal is output from the voltage monitor 17 as the motor terminal voltage information VI. That is, in the voltage monitor 17, the voltage across the points A and C is converted into the Hi/Lo signal and input to the rotation direction detector 13. In the rotation direction detector 13, the rotation direction of the motor 3 is detected by a combination of the motor terminal voltage information VI (Hi or Lo) and the current direction information CI (A→B or B→A).

Figure 5:
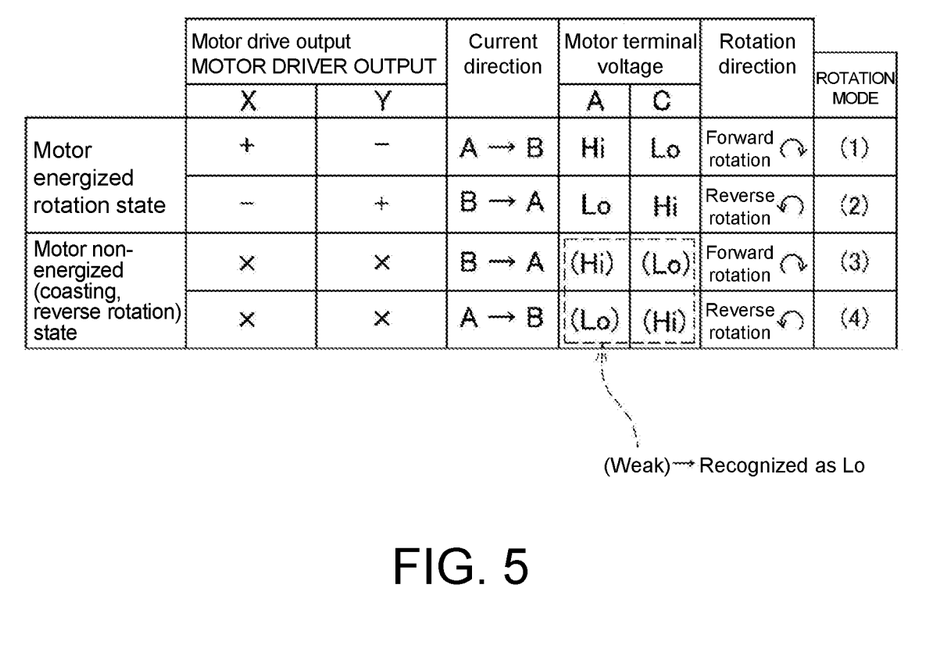
FIG. 5 is a table showing detection processing in a rotation direction detector.

FIG. 5 is a table showing the detection processing in the rotation direction detector 13. The "motor drive output" in FIG. 5 indicates the output of the motor driver 2. In this case, when the motor 3 is in the energized state, and the output X side is + and the output Y side is −, the current direction is A→B and the motor 3 rotates forward (shown as clockwise in the table). On the other hand, when the output X side is − and the output Y side is +, the current direction is B→A and the motor 3 rotates reversely (shown as counterclockwise in the table). In addition, when the motor 3 is in the non-energized state, there is no motor drive output ("×"). Therefore, when no electric power is supplied to the motor 3 and the motor 3 is coasting or is rotated reversely by an external force, the motor drive output becomes "×". However, in the case of reverse rotation due to the coasting state or an external force, an induced voltage is generated by the rotation of the motor 3, and a current of A→B or B→A is generated between the points A and B depending on the rotation direction.

As shown in FIG. 5, here, according to the motor terminal voltage information VI (Hi or Lo) and the current direction information CI (A→B or B→A), there are four combinations (rotation modes) (1) to (4). Hereinafter, the detection processing of the rotation direction detector 13 in each of the rotation modes (1) to (4) will be described.

(1) Rotation Mode (1)
Current direction: A→B (from one side to the other side)
Motor terminal voltage: A (one side)=Hi, C (the other side)=Lo
In this case, the output X side is +, the output Y side is −, electric power is supplied to the motor 3 (energized state), and the motor 3 is rotating forward.
When the current direction is A→B, the current waveform direction determination part 16 sends the current direction information CI (A→B) from the port P to the rotation direction detector 13. The information CI (A→B) is input to AND1 of the rotation direction detector 13.
On the other hand, from the voltage monitor 17, the motor terminal voltage information VI of A=Hi and C=Lo is sent to the rotation direction detector 13, and the rotation direction detector 13 recognizes that A=Hi and C=Lo. A=Hi is input to AND1. AND1 generates an output only when (A→B) and (A=Hi), and in this case, a signal is sent from AND1 to OR1. Since OR1 which inputs the signal from AND1 is "OR", OR1 receives the signal and outputs a signal, and a detection signal of forward rotation is output from the port R. As a result, the motor drive control device arranged after the rotation direction detecting device 1 can grasp that the motor 3 is in the rotation state of forward rotation (rotation in one direction).

In the induced voltage complementing circuit 19, since A=Hi, the output of NOT1 becomes Lo and AND5 does not output a signal, but because OR3 is "OR", it receives A=Hi and outputs a signal to AND3. In AND3, since the current direction is A→B, the current direction information CI is not input from the port Q and the output of AND3 is "L". However, as described above, since OR1 is "OR", the signal from AND1 is received and a detection signal of forward rotation is output from the port R. On the other hand, since no signal is output from AND5 to OR4 and C=Lo, no signal is output from OR4 to AND4. Therefore, no signal is output from AND4 to OR2. At this time, the current direction information CI is not sent from the port Q to AND2 and no signal comes from AND2 to OR2. Therefore, no signal is output from the port L.

(2) Rotation Mode (2)
Current direction: B→A (from the other side to one side)
Motor terminal voltage: A=Lo, C=Hi
In this case, the output X side is − and the output Y side is + (energized state), and the motor 3 is rotating reversely.
When the current direction is B→A, the current waveform direction determination part 16 sends the current direction information CI (B→A) from the port Q to the rotation direction detector 13. The information CI (B→A) is input to AND 2 of the rotation direction detector 13.
On the other hand, from the voltage monitor 17, the motor terminal voltage information VI of A=Lo and C=Hi is sent to the rotation direction detector 13, and the rotation direction detector 13 recognizes that A=Lo and C=Hi. C=Hi is input to AND2. AND2 generates an output only when (B→A) and (C=Hi), and in this case, a signal is sent from AND2 to OR2. Since OR2 which inputs the signal from AND2 is "OR", OR2 receives the signal and outputs a signal, and a detection signal of reverse rotation is output from the port L. As a result, the motor drive control device can grasp that the motor 3 is in the rotation state of reverse rotation (rotation in the other direction).

Also, in this case, in the induced voltage complementing circuit 19, since C=Hi, the output of NOT2 becomes Lo and AND5 does not output a signal, but because OR4 is "OR", it receives C=Hi and outputs a signal to AND3. In AND4, since the current direction is B→A, the current direction information CI is not input from the port P and the output of AND4 becomes "L". However, as described above, since OR2 is "OR", the signal from AND2 is received and a detection signal of reverse rotation is output from the port L. On the other hand, since no signal is output from AND5 to OR3 and A=Lo, no signal is output from OR3 to AND3. Therefore, no signal is output from AND3 to OR1. At this time, the current direction information CI is not sent from the port P to AND1 and no signal comes from AND1 to OR1. Therefore, no signal is output from the port R.

Figure 6:
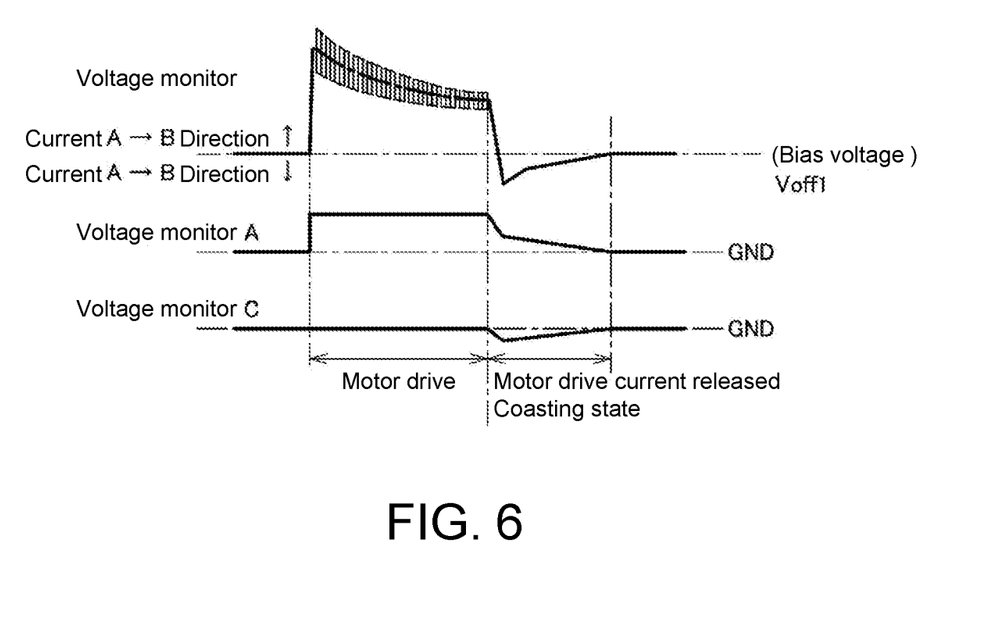
FIG. 6 is an explanatory diagram showing a state of a current direction and a motor terminal voltage during a motor operation (rotation mode (3)).

(3) Rotation Mode (3)
Current direction: B→A
Motor terminal voltage: A=Hi (weak), C=Lo (weak)
In this case, the motor 3 is in the non-energized state, and the output X side and Y side are both ×. FIG. 6 is an explanatory diagram showing a state of the current direction and the motor terminal voltage during a motor operation corresponding to the rotation mode (3), and here it shows a case where energization is turned off during forward rotation of the motor and the motor enters the coasting state. As shown in FIG. 6, the motor 3 remains rotating even after energization is turned off, and an induced voltage is generated. At this time, the motor terminal voltages A and C are A=Hi and C=Lo. However, since the voltage level resulting from the induced voltage is low (equal to or smaller than the threshold value Vs), the Lo signal is output from the voltage monitor 17 for both A and C. In other words, although the current direction information CI is present, the motor terminal voltage information VI is both in the Lo state. Therefore, the rotation direction detector 13 recognizes that the motor terminal voltages A and C are both Lo.

As shown in FIG. 2, at this time, the motor terminal voltage information VI=Lo is input to NOT1 and NOT2 and converted into a Hi signal, and then input to AND5. AND5 outputs a signal only when the signals of NOT1 and NOT2 are both Hi. Therefore, in the case of the rotation mode (3), since the outputs of NOT1 and NOT2 are both Hi, a signal (complementary output Z:ON=Hi) is output to OR3 and OR4.

Here, in the case of the rotation mode (3), since the current direction is B→A, the current direction information CI (B→A) is sent from the port Q to the rotation direction detector 13, and this signal is input to AND3 (there is no input to AND4). AND3 generates an output only when (B→A) and (complementary output Z:ON). In the rotation mode (3), since (B→A) and (Z:ON), a signal is sent from AND3 to OR1. OR1 which inputs the signal from AND3 receives the signal and outputs a signal, and a detection signal of forward rotation is output from the port R. As a result, the motor drive control device can grasp that the motor 3 is in the rotation state of forward rotation. In other words, whether the motor 3 rotates and the rotation direction are detected even in the non-energized state.

Figure 7:
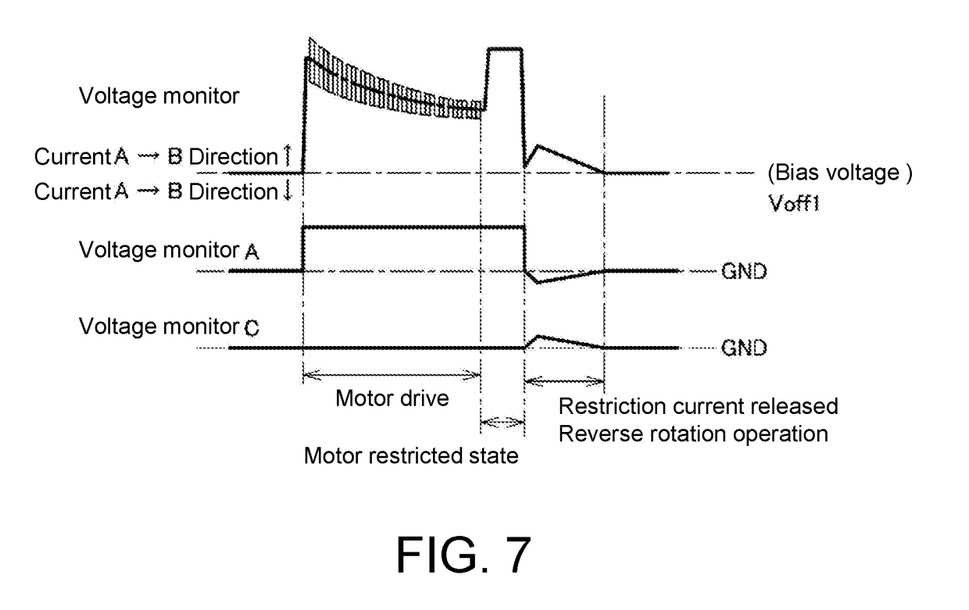
FIG. 7 is an explanatory diagram showing a state of the current direction and the motor terminal voltage during a motor operation (rotation mode (4)).

(4) Rotation Mode (4)
Current direction: A→B
Motor terminal voltage: A=Lo (weak), C=Hi (weak)
Similar to the case of the rotation mode (3), the motor 3 is in the non-energized state, and the output X side and Y side are both x. FIG. 7 is an explanatory diagram showing a state of the current direction and the motor terminal voltage during a motor operation corresponding to the rotation mode (4), and here it shows a case where the rotation is restricted while the motor is rotating forward, and then the motor is released and rotates reversely. As shown in FIG. 7, after the motor is released from rotation restriction, the motor 3 rotates reversely due to the reaction and an induced voltage is generated. At this time, the motor terminal voltages A and C are A=Lo and C=Hi. However, since the voltage level resulting from the induced voltage is low (equal to or smaller than the threshold value Vs), similar to the rotation mode (3), the Lo signal is output from the voltage monitor 17 for both A and C, and the rotation direction detector 13 recognizes that the motor terminal voltages A and C are both Lo.

Also, in this case, the motor terminal voltage information VI=Lo is input to NOT1 and NOT2 and converted into a Hi signal, and then input to AND5. In the case of the rotation mode (4), since the outputs of NOT1 and NOT2 are both Hi, a signal (complementary output Z:ON=Hi) is output to OR3 and OR4. Since OR3 and OR4 which input the complementary output Z from AND5 are "OR", they receive the signal and output a signal to AND3 and AND4.

In the case of the rotation mode (4), since the current direction is A→B, the current direction information CI (A→B) is sent from the port P to the rotation direction detector 13, and this signal is input to AND4 (there is no input to AND3). AND4 generates an output only when (A→B) and (complementary output Z:ON), and in the rotation mode (4), since (A→B) and (Z:ON), a signal is output from AND4 to OR2. OR2 which inputs the signal from AND4 receives the signal and outputs a signal, and a detection signal of reverse rotation is output from the port L. As a result, the motor drive control device can grasp that the motor 3 is in the rotation state of reverse rotation. In other words, similar to the case of the rotation mode (3), whether the motor 3 rotates and the rotation direction are detected even in the non-energized state.

As described above, with the rotation direction detecting device 1 of the invention, it is possible to detect whether the motor 3 rotates and the rotation direction by a logical combination of the direction of the motor current and the motor terminal voltage without using a rotation sensing element. For example, whether the motor rotates and the direction can be accurately detected even if the motor enters the coasting state after energization, the motor rotates reversely after the motor stops, or the armature rotates due to an external force when the motor is not energized. Therefore, the motor operation state can be accurately grasped, and the accuracy of the rotation position information can be increased to improve the motor control accuracy. As a result, for example, the pinch detection accuracy of the motor for power window can be increased to improve the reliability. In addition, the elimination of a rotation sensing element eliminates the need for an element housing space, and correspondingly the size of the motor is reduced and the manufacturing cost of the motor is also reduced.

Second Embodiment

Figure 8:
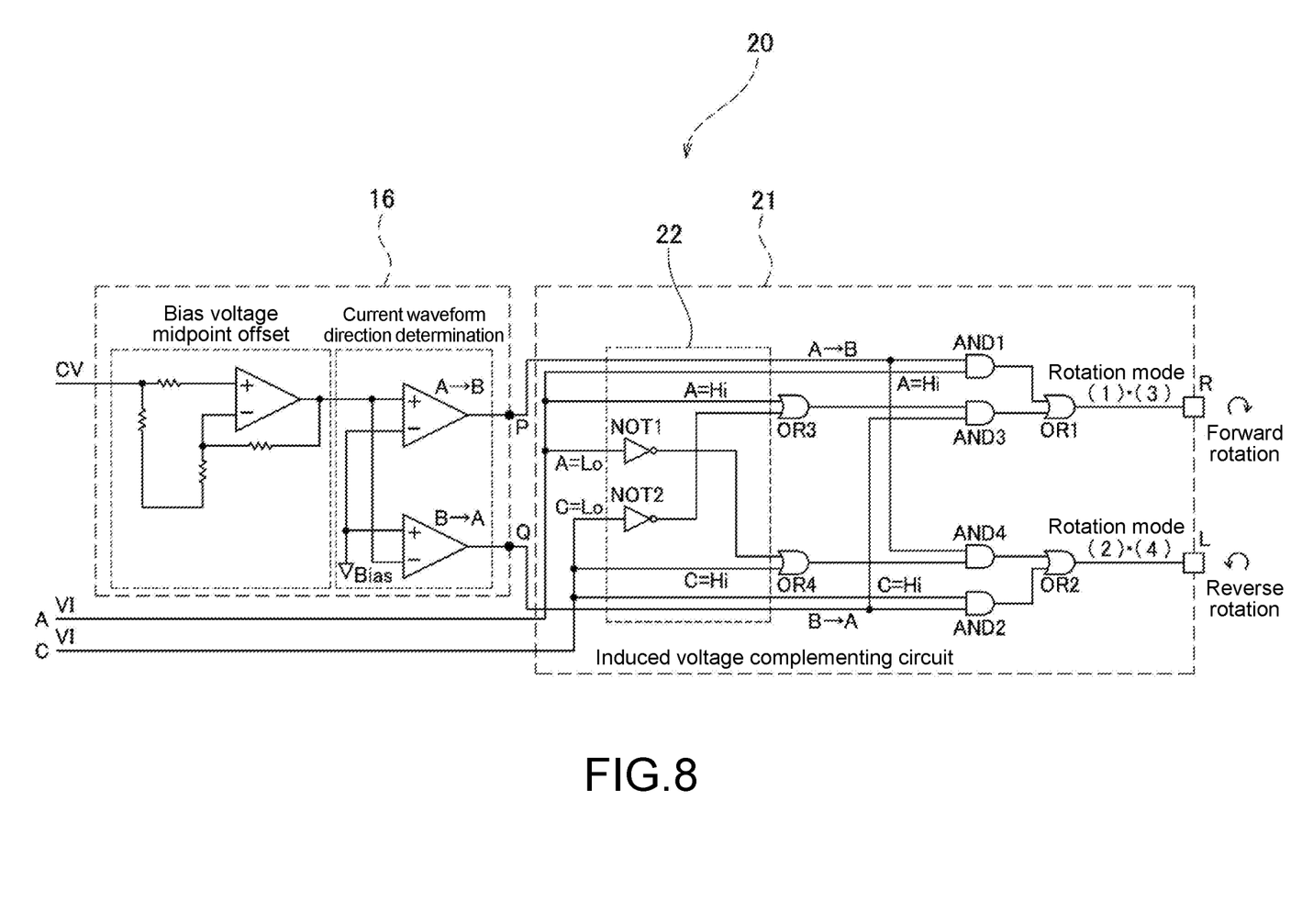
FIG. 8 is an explanatory diagram showing an internal configuration of a rotation direction detecting device in the rotation direction detecting device which is the second embodiment of the invention.

Next, a rotation direction detecting device which is the second embodiment of the invention will be described. FIG. 8 is an explanatory diagram showing an internal configuration of a rotation direction detector 21 in a rotation direction detecting device 20 which is the second embodiment of the invention. In the rotation direction detecting device 20, an induced voltage complementing circuit 22 in the rotation direction detector 21 has a configuration different from that of the induced voltage complementing circuit 19 of the first embodiment. That is, as shown in FIG. 8, the induced voltage complementing circuit 22 is configured by omitting AND5 from the induced voltage complementing circuit 19 of the first embodiment. The other configuration is the same as that of the rotation direction detecting device 1 of the first embodiment. In the following description, parts the same as those of the first embodiment are denoted by the same reference numerals and the description thereof is omitted.

Here, for the above-described induced voltage complementing circuit 19, there is a concern that a hazard may occur when the logic is switched during a motor operation, such as when energization is stopped and the motor enters the coasting state. For example, when shifting from the rotation mode (1) to the rotation mode (3), an induced voltage is generated in the motor 3 due to the stop of energization. At this time, if the induced voltage is larger than the threshold value Vs, the logic switches during the coasting state. In other words, when the motor is in the coasting state and the rotation speed is decreasing, the induced voltage falls below the threshold value Vs at some point and the logic is rapidly switched. At this time, in the rotation direction detector 13 of the first embodiment, the motor terminal voltage information VI from the voltage monitor 17 and the complementary output Z formed from the information VI through the induced voltage complementing circuit 19 are input to OR3 and OR4. Then, the outputs of OR3 and OR4 may become unstable for a moment due to the influence of the delay time of the element.

Figure 9:
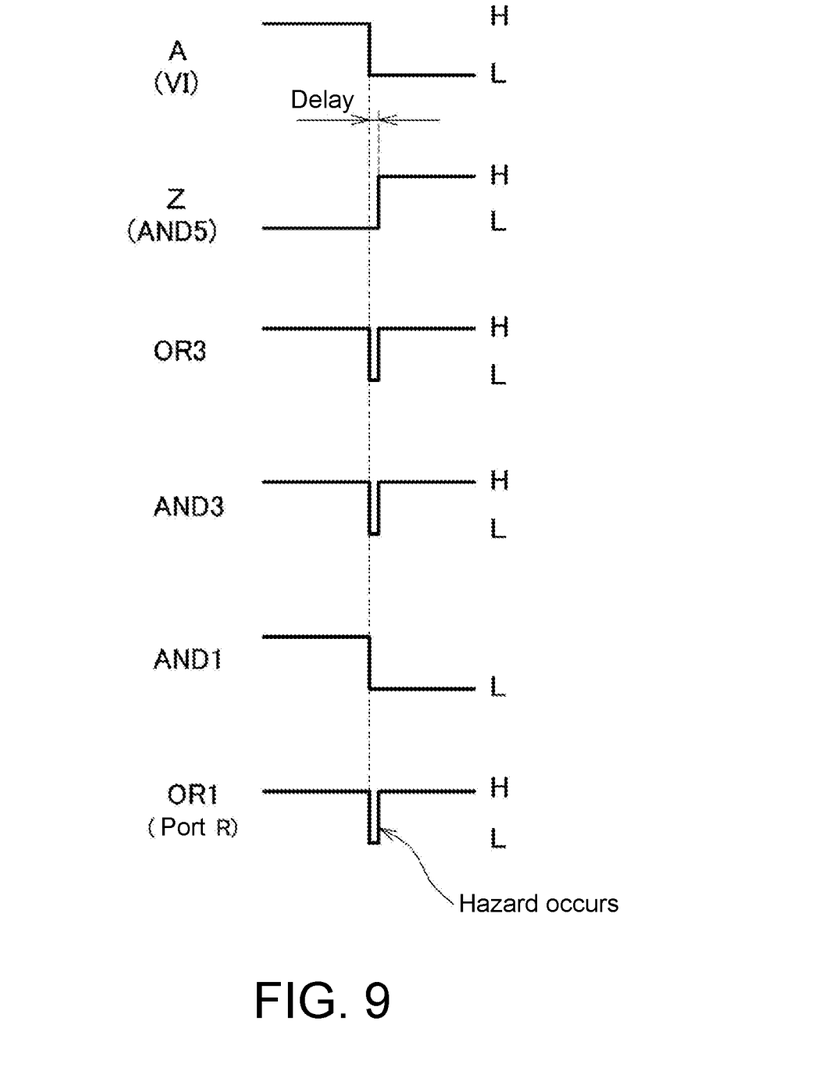
FIG. 9 is an explanatory diagram of a hazard phenomenon in an induced voltage complementing circuit.

For example, in OR3, when the induced voltage is larger than the threshold value Vs, OR3:H (signal output) due to A(VI)=Hi. Thereafter, when the induced voltage becomes smaller than the threshold value Vs, A=Lo, and this time, OR3:H due to Z=Hi. Therefore, logically, a signal is continuously output from OR3. However, if there is a moment when A and Z both become Lo due to the delay of the induced voltage complementing circuit 19, that moment results in OR3:L (signal non-output). Then, as shown in FIG. 9, the output of AND3 also becomes "L". At this time, since A=Lo, AND1 becomes "L", and AND1 and AND3 are both "L". As a result, OR1:L, and the detection signal from the port R is also interrupted for a moment. That is, if the outputs of OR3 and OR4 become unstable during coasting, the outputs from the ports R and L may also be disturbed, and the detection accuracy of the rotation direction may drop.

Thus, the induced voltage complementing circuit 22 of the second embodiment adopts a configuration in which AND5 is omitted, the output of NOT1 is input to OR4, and the output of NOT2 is input to OR3, so as to prevent occurrence of a hazard and reduce the number of elements. Hereinafter, the operation of the induced voltage complementing circuit 22 in the above-described rotation modes (1) to (4) will be described.

(1) Rotation Mode (1)

When the current direction is A→B, the current waveform direction determination part 16 sends the current direction information CI (A→B) from the port P to the rotation direction detector 21. The information CI (A→B) is input to AND1 of the rotation direction detector 21. Further, the motor terminal voltage information VI of A=Hi and C=Lo is sent from the voltage monitor 17, and the rotation direction detector 21 recognizes that A=Hi and C=Lo. A=Hi is input to AND1, and a signal is sent from AND1 to OR1. OR1 which inputs the signal from AND1 receives the signal and outputs a signal, and a detection signal of forward rotation is output from the port R. As a result, the motor drive control device can grasp that the motor 3 is in the rotation state of forward rotation.

In the induced voltage complementing circuit 22, when A=Hi and C=Lo is input, the outputs of NOT1 and NOT2 become Lo and Hi respectively and are input to OR4 and OR3. OR3 receives A=Hi and NOT2:Hi and outputs a signal to AND3. However, since the current direction is A→B, the current direction information CI is not sent from the port Q to AND3, and the output of AND3 becomes "L". However, as described above, since OR1 is "OR", the signal from AND1 is received, and a detection signal of forward rotation is output from the port R. On the other hand, since NOT1:Lo and C=Lo is input, OR4 does not output a signal to AND4. Therefore, no signal is output from AND4 to OR2. At this time, since no signal comes from the port Q, AND2 does not output a signal to OR2 and no signal is output from the port L.

(2) Rotation Mode (2)

When the current direction is B→A, the current waveform direction determination part 16 sends the current direction information CI (B→A) from the port Q to the rotation direction detector 21. The information CI (B→A) is input to AND2 of the rotation direction detector 21. Further, the motor terminal voltage information VI of A=Lo and C=Hi is sent from the voltage monitor 17 to the rotation direction detector 21, and the rotation direction detector 21 recognizes that A=Lo and C=Hi. C=Hi is input to AND2, and a signal is sent from AND2 to OR2. OR2 which inputs the signal from AND2 receives the signal and outputs a signal, and a detection signal of reverse rotation is output from the port L. As a result, the motor drive control device can grasp that the motor 3 is in the rotation state of reverse rotation.

Also, in this case, in the induced voltage complementing circuit 22, when A=Lo and C=Hi is input, the outputs of NOT1 and NOT2 become Hi and Lo respectively and are input to OR4 and OR3. OR4 receives C=Hi and NOT1:Hi and outputs a signal to AND4. However, since the current direction is A→B, the current direction information CI is not sent from the port P to AND4, and the output of AND4 becomes "L". However, as described above, since OR2 is "OR", the signal from AND2 is received, and a detection signal of reverse rotation is output from port L. On the other hand, since NOT2:Lo and A=Lo is input, OR3 does not output a signal to AND3. Therefore, no signal is output from AND3 to OR1. At this time, since no signal comes from the port P, AND1 does not output a signal to OR1 and no signal is output from the port R.

(3) Rotation Mode (3)

In the rotation mode (3), the motor terminal voltages A and C are A=Hi and C=Lo, but as described above, the Lo signal is output from the voltage monitor 17 for both A and C. A, C=Lo is input to NOT1 and NOT2 and converted into a Hi signal, and then input to OR4 and OR3. OR4 and OR3 which receive the Hi signal output signals to AND4 and AND3. In the case of the rotation mode (3), the current direction information CI (B→A) is sent from the port Q to the rotation direction detector 21, and this signal is input to AND3 and AND2. Therefore, AND3 receives the signals from OR3 and the port Q, and outputs a signal to OR1. OR1 receives the signal from AND3 and outputs a detection signal of forward rotation from the port R. On the other hand, since no signal comes from the port P, AND4 does not output a signal to OR2. Due to C=Lo, no signal comes to OR2 from AND2 either, and therefore, no signal is output from the port L.

(4) Rotation Mode (4)

Similar to the case of the rotation mode (3), the Lo signal is output for both A and C. A, C=Lo is input to NOT1 and NOT2 and converted into a Hi signal, and then input to OR4 and OR3. OR4 and OR3 which receive the Hi signal output signals to AND4 and AND3. In the case of the rotation mode (4), the current direction information CI (A→B) is sent from the port P to the rotation direction detector 21, and this signal is input to AND4 and AND1. Therefore, AND4 receives the signals from OR4 and the port P and outputs a signal to OR2. OR2 receives the signal from AND4 and outputs a detection signal of reverse rotation from the port L. On the other hand, since no signal comes from the port Q, AND3 does not output a signal to OR1. Due to A=Lo, no signal comes to OR1 from AND1 either, and therefore, no signal is output from the port R.

As described above, with the rotation direction detecting device of the second embodiment, it is also possible to detect whether the motor 3 rotates and the rotation direction by a logical combination of the direction of the motor current and the motor terminal voltage without using a rotation sensing element. In addition, the induced voltage complementing circuit 22 eliminates one element from the induced voltage complementing circuit 19 of the first embodiment because AND5 is omitted, so the circuit configuration can be simplified and the number of components can be reduced.

Furthermore, in the induced voltage complementing circuit 19, OR3 and OR4 input the Hi signal from NOT1 and NOT2 if any of the motor terminal voltage information VI (A and C) is Lo. Therefore, signals are output from OR3 and OR4 regardless of the values of the induced voltage and the threshold value Vs. That is, even if the logic is switched during the coasting state, the outputs of OR3 and OR4 are not affected by the delay time of the element and are maintained without interruption. Therefore, it is possible to prevent occurrence of a hazard when the logic is switched.

For example, in the motor 3, when the induced voltage is larger than the threshold value Vs, A(VI)=Hi and C(VI)=Lo, but the Hi signal is input from NOT1 to OR3 together with A=Hi, and it becomes OR3:H. On the other hand, when the induced voltage is smaller than the threshold value Vs, A=Lo and C=Lo, but C=Lo→NOT1=Hi does not change, and the output of OR3 is maintained at "H" without being affected by the logic switching. Therefore, the detection signal from the port R is not interrupted due to the hazard during logic switching, and the outputs from the ports R and L can be stabilized to improve the detection accuracy of the rotation direction.

Nevertheless, the invention is not limited to the above-described embodiments, and it is possible to make various changes without departing from the scope of the invention. For example, although the above-described embodiments illustrate a configuration using the logic circuit as shown in FIG. 2 in the rotation direction detector 13, the configuration of the rotation direction detector 13 is not limited thereto. The relationship between the current direction and the motor terminal voltage may be tabulated, and the rotation direction of the motor may be detected by a CPU or the like based on this table.

INDUSTRIAL APPLICABILITY

The rotation direction detecting device and the rotation direction detecting method according to the invention are applicable not only to the operation control of the motor for power window as in the above-described embodiments, but also to motors for other in-vehicle electric devices such as wipers and power seats. For example, by applying the invention to the motor for power seat, seat position control can be improved. Further, the invention is applicable not only to in-vehicle motors but also to brush motors used for household electric appliances or the like.

What is claimed is:

1. A rotation direction detecting device for a motor, the rotation direction detecting device being connected to a power supply line that supplies electric power to the motor and detecting a rotation direction of the motor, the rotation direction detecting device comprising:
a current detector detecting a direction of a current flowing through the motor;
a voltage detector detecting voltages before and after the motor in the power supply line; and
a rotation direction detector detecting the rotation direction of the motor based on the direction of the current detected by the current detector and the voltages detected by the voltage detector,
wherein the voltage detector comprises a voltage monitor that compares the voltages before and after the motor with a predetermined threshold value and converts the voltages into Hi/Lo signals respectively to be output.

2. The rotation direction detecting device according to claim 1, wherein the power supply line is connected to a terminal on one side and a terminal on the other side of the motor,
the current detector determines the direction of the current between a case where the current flows from the terminal on one side to the terminal on the other side and a case where the current flows from the terminal on the other side to the terminal on one side,
the voltage detector respectively detects voltages of the terminal side on one side and the terminal side on the other side of the motor in the power supply line, and
the rotation direction detector detects the rotation direction of the motor by a combination of the directions of the current of the two cases and the Hi/Lo signals converted and formed with respect to the voltages on the one side and the other side of the motor.

3. The rotation direction detecting device according to claim 2, wherein if electric power is supplied to the motor, the rotation direction detector
determines that the motor is rotating in one direction when the direction of the current is from the one side to the other side, and the voltage on the one side in the power supply line is Hi and the voltage on the other side is Lo, and
determines that the motor is rotating in the other direction when the direction of the current is from the other side to the one side, and the voltage on the one side in the power supply line is Lo and the voltage on the other side is Hi.

4. The rotation direction detecting device according to claim 2, wherein if electric power is not supplied to the motor, the rotation direction detector
determines that the motor is rotating in one direction when the direction of the current is from the other side to the one side, and the voltage on the one side and the voltage on the other side in the power supply line are both recognized as Lo, and
determines that the motor is rotating in the other direction when the direction of the current is from the one side to the other side, and the voltage on the one side and the voltage on the other side in the power supply line are both recognized as Lo.

5. The rotation direction detecting device according to claim 3, wherein if electric power is not supplied to the motor, the rotation direction detector
determines that the motor is rotating in one direction when the direction of the current is from the other side to the one side, and the voltage on the one side and the voltage on the other side in the power supply line are both recognized as Lo, and
determines that the motor is rotating in the other direction when the direction of the current is from the one side to the other side, and the voltage on the one side and the voltage on the other side in the power supply line are both recognized as Lo.

6. A rotation direction detecting method for a motor for detecting a rotation direction of the motor, the motor being connected to a power supply line for supplying electric power to the motor, the rotation direction detecting method comprising:
detecting a direction of a current flowing through the motor;
detecting voltages before and after the motor in the power supply line;
detecting the rotation direction of the motor based on the direction of the current and the voltages;
comparing the voltages before and after the motor with a predetermined threshold value and converting the voltages into Hi/Lo signals respectively; and detecting the rotation direction of the motor based on the direction of the current and the Hi/Lo signals corresponding to the voltages.

7. The rotation direction detecting method according to claim 6, wherein the power supply line is connected to a terminal on one side and a terminal on the other side of the motor,
- the direction of the current is determined between a case where the current flows from the terminal on one side to the terminal on the other side and a case where the current flows from the terminal on the other side to the terminal on one side,
- voltages of the terminal side on one side and the terminal side on the other side of the motor are respectively detected as the voltages before and after the motor in the power supply line, and
- the rotation direction of the motor is detected by a combination of the directions of the current of the two cases and the Hi/Lo signals converted and formed with respect to the voltages on the one side and the other side of the motor.

8. A motor control device, comprising a rotation direction detecting device connected to a power supply line that supplies electric power to a motor and detecting a rotation direction of the motor, wherein the rotation direction detecting device comprises:
- a current detector detecting a direction of a current flowing through the motor;
- a voltage detector detecting voltages before and after the motor in the power supply line; and
- a rotation direction detector detecting the rotation direction of the motor based on the direction of the current detected by the current detector and the voltages detected by the voltage detector,
- wherein the voltage detector comprises a voltage monitor that compares the voltages before and after the motor with a predetermined threshold value and converts the voltages into Hi/Lo signals respectively to be output.

* * * * *